G. C. ATKINSON.
WATERPROOF CAR DOOR.
APPLICATION FILED FEB. 27, 1917.

1,251,855.

Patented Jan. 1, 1918.
2 SHEETS—SHEET 1.

Witness:
R N Jones
H T Riley

Inventor
G. C. Atkinson.
By [signature]
Attorney

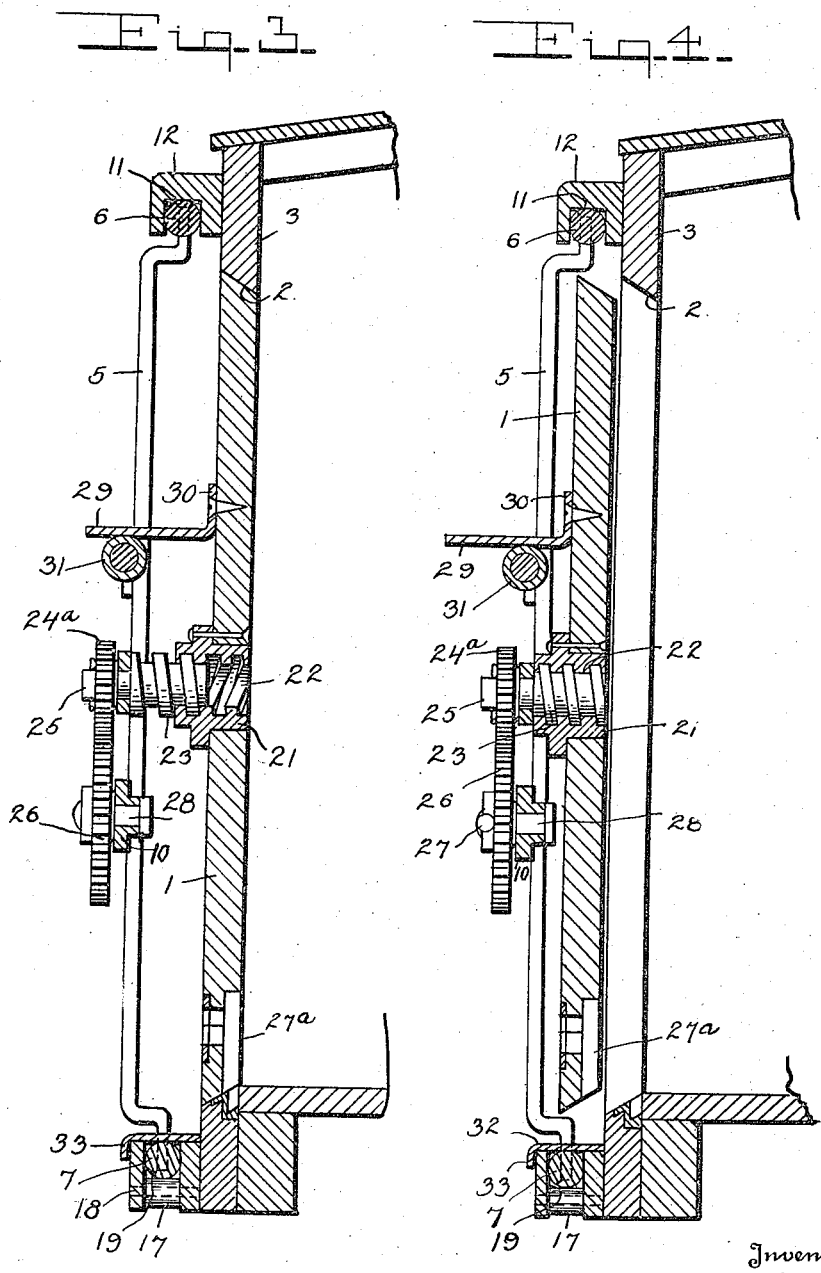

UNITED STATES PATENT OFFICE.

GEORGE C. ATKINSON, OF GEORGETOWN, TEXAS.

WATERPROOF CAR-DOOR.

1,251,855.   Specification of Letters Patent.   Patented Jan. 1, 1918.

Application filed February 27, 1917. Serial No. 151,296.

*To all whom it may concern:*

Be it known that I, GEORGE C. ATKINSON, a citizen of the United States, residing at Georgetown, in the county of Williamson and State of Texas, have invented certain new and useful Improvements in Waterproof Car-Doors; and I do hereby declare the following to be a full, clear, and exact description of the invention, such as will enable others skilled in the art to which it appertains to make and use the same.

The invention relates to improvements in freight car doors.

The object of the present invention is to improve the construction of freight car doors and to provide a simple, practical and efficient freight car door of strong, durable and inexpensive construction which will be water and air tight, and which will be practically indestructible in case of a wreck.

A further object of the invention is to provide a freight car door of this character adapted to be advantageously employed as a refrigerator car and capable also of effectually preventing a tramp or other intruder from closing the door from the interior and preventing an inspection of the car.

With these and other objects in view, the invention consists in the construction and novel combination of parts hereinafter fully described, illustrated in the accompanying drawings and pointed out in the claims hereto appended; it being understood that various changes in the form, proportion, size and minor details of construction, within the scope of the claims, may be resorted to without departing from the spirit or sacrificing any of the advantages of the invention.

In the drawings:

Fig. 3 is a transverse sectional view, the door being closed.

Fig. 4 is a similar view, the door being withdrawn from the opening of the car body.

Like numerals of reference designate corresponding parts in the several figures of the drawings.

In the accompanying drawings, in which is illustrated the preferred embodiment of the invention, 1 designates a car door beveled at its upper, lower and side edges and adapted to fit a correspondingly constructed door opening 2 of a car body 3. The car body is beveled at the top, bottom and sides of the door opening to provide a water and air-tight fit for the door which owing to the tight fit may be advantageously employed on freight cars of the refrigerator type as well as on the ordinary freight car.

Figure 1:
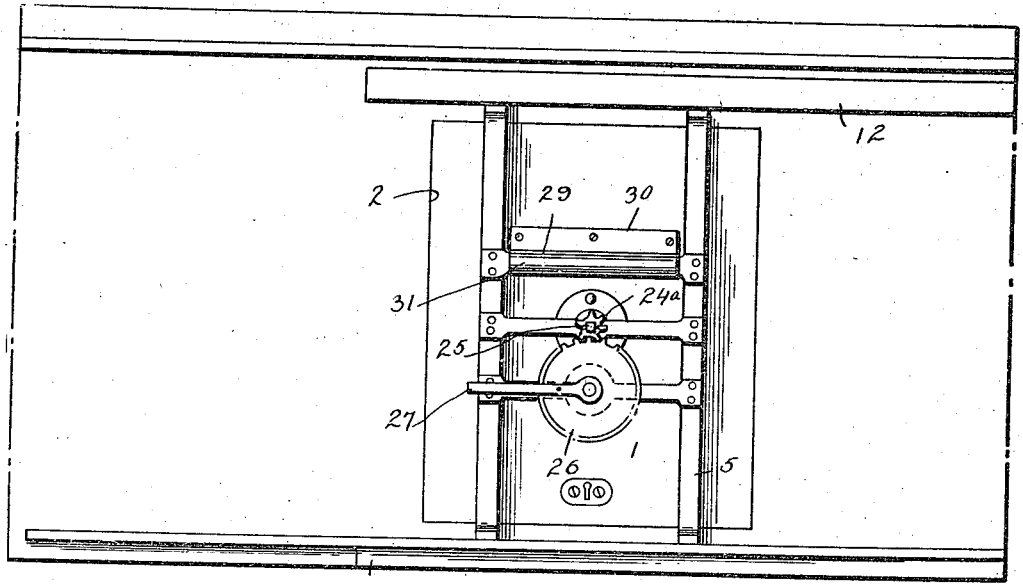
Figure 1 is a front elevation of a car door constructed in accordance with this invention and shown applied to a freight car.
Figure 2:
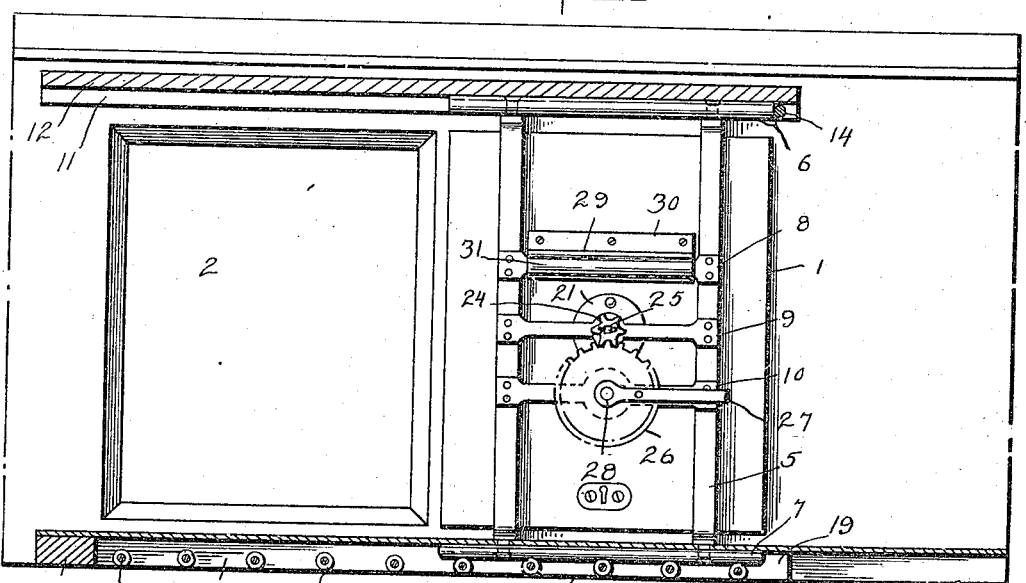
Fig. 2 is a longitudinal sectional view of the same.

The car door is carried by a slidable frame 4 constructed of stout metal and preferably composed of outwardly bowed side bars 5, top and bottom connecting slides 6 and 7 and intermediate connecting bars 8, 9 and 10, which are rigidly secured to the side bars forming a rigid frame. The upper slide 6 operates in a groove 11 of an upper longitudinal guide or way 12 secured to the side of the car body at the top of the door opening and extending beyond the same, as clearly shown in Figs. 1 and 2 of the drawings, to permit the frame to slide to and from a position in front of the door opening. The outward sliding movement of the frame is limited by a stop 14 and the inward sliding movement is limited by a stop hereinafter described so that the frame will be moved only the proper distance to uncover the door opening and also to arrange the door directly in front of the door opening so that the door may be accurately closed by the means hereinafter described.

The lower slide operates in a guide 15 having a longitudinal opening 16, in which is mounted supporting rollers 17 over which the lower slide 7 moves, but any other suitable anti-friction devices may of course be employed. The rollers are mounted on shafts or spindles 18 which extend across the slot or opening 16 in the lower guide. The lower guide is provided at one end with an opening or entrance 19 and the other end is closed at 20 to form a stop for the sliding frame to limit the movement of the same in carrying the door opposite the door opening 2. The anti-friction devices support the slidable frame and the door and enable the frame and the door to slide to and from the opening with a minimum amount of friction.

The door is equipped with a centrally arranged nut 21 having a coarse thread 22 to engage the coarse thread of a screw 23 journaled or swiveled in a bearing 24 of the transverse or horizontal connecting bar 9 of the slidable frame and adapted to be rotated to move the door inwardly and outwardly to carry the door into the opening 2 and to withdraw the same therefrom. The screw is equipped at its outer end with a pinion 24ª secured on a squared portion 25 of the screw and meshing with a gear wheel 26 carrying an operating handle 27 and supported by a stub shaft 28, which is mounted on the horizontal connecting bar 10. In practice about two revolutions of the screw will be necessary to carry the door into and out of the door opening and the gear will be proportioned so that one-half of a revolution of the gear will rotate the pinion a sufficient distance to carry the door into or out of the said opening. This will enable the handle or lever of the gear to swing from a horizontal position at one side of the frame to a similar position at the opposite side of the frame, but it may be arranged to swing to any other desired position. The lever may be secured or sealed in any desired position and if desired a suitable lock 27ª may be employed for holding the door in the opening and preventing its outward movement therefrom. The lock is preferably located at the bottom of the door and the bolt of the lock may engage a keeper in the floor of the car. Any other arrangement of lock may of course be employed.

The door is equipped with a weather guard or strip 29 provided at the inner edges with an attaching portion 30 secured to the outer face of the door. The weather or guard strip 29 extends outwardly and projects over a roller 31 which is mounted on the upper horizontal one of the intermediate set of bars, as clearly shown in Figs. 3 and 4. The roller, which is mounted on the bar 8, enables the weather guard or strip, which is constructed of sheet metal or other suitable material, to slide inwardly and outwardly over the frame. The slidable frame is provided with a bottom weather strip or guard 32 constructed of sheet metal or other suitable material and secured intermediate of its ends to the bottom of the frame directly over the lower slide 7 and extending in advance and in rear of the said slidable frame so as to completely cover the guide when the door is in its open or closed position. The lower weather strip or guard is provided at its outer edge with a depending longitudinal flange 33 which fits against the exterior of the lower guide. The lower guide is protected from water and also the accumulation of dust and dirt and it is preferably round, as shown, but any other form may of course be employed as will be readily understood. The door is readily operated from the exterior to open and close it and also to slide it to and from the door opening and it will be impossible for a tramp or other intruder to enter the car and close the door from the interior thereof and thereby conceal himself within the car.

The screw is made relatively large both for the provision of the coarse thread and also to provide a construction which will be practically indestructible in event of the wreck of a train. Also the easy operation of the door will remove all the objections urged against the ordinary freight car door and it will be unnecessary to employ tools or injure the door to open and close the same. The particular construction of the door and the manner of mounting the same effectually prevents the accumulation of water and the freezing of the same in any of the parts of the car door so as to interfere with the free operation of the same.

What is claimed is:

1. The combination with a car body having a door opening, and upper and lower guides located at the top and bottom of the door opening, of slides operating in the said guides, a frame rigid with the slides, a car door movable into and out of the door opening and provided with a nut, a screw mounted on the sliding frame and engaging the nut for moving the door inwardly and outwardly, a pinion fixed to the screw, a gear wheel mounted for rotary movement on the said frame and meshing with the pinion, and an operating arm or lever connected with the gear wheel and arranged to swing from one side of the frame to the other to move the door inwardly and outwardly.

2. The combination with a car body having a door opening, of upper and lower guides, a slidable frame operating in the guides, a door mechanism mounted on the frame and connected with the door for moving the same inwardly and outwardly into and out of the opening of the car body, a horizontal roller mounted on the frame and extending along the same above the said mechanism, and a weather guard or strip secured to the door and extending outwardly therefrom and having its outer portion arranged upon the said roller, said weather guard or strip being movable over the roller when the door is moved inwardly and outwardly.

In testimony whereof I affix my signature in presence of two witnesses.

GEO. C. ATKINSON.

Witnesses:
F. D. LOVE,
D. E. DAVIS.

Copies of this patent may be obtained for five cents each, by addressing the "Commissioner of Patents, Washington, D. C."